(12) United States Patent
Ardes

(10) Patent No.: US 12,478,901 B2
(45) Date of Patent: Nov. 25, 2025

(54) FLUID FILTER AND HOUSING FOR THE FLUID FILTER

(71) Applicant: HENGST SE, Münster (DE)

(72) Inventor: Wilhelm Ardes, Ascheberg (DE)

(73) Assignee: HENGST SE, Münster (DE)

( * ) Notice: Subject to any disclaimer, the term of this patent is extended or adjusted under 35 U.S.C. 154(b) by 0 days.

(21) Appl. No.: 19/016,465

(22) Filed: Jan. 10, 2025

(65) Prior Publication Data

US 2025/0205620 A1    Jun. 26, 2025

Related U.S. Application Data

(63) Continuation of application No. PCT/EP2023/069495, filed on Jul. 13, 2023.

(30) Foreign Application Priority Data

Jul. 13, 2022    (EP) .................................. 22184720

(51) Int. Cl.
   *B01D 27/08*    (2006.01)
(52) U.S. Cl.
   CPC ........ *B01D 27/08* (2013.01); *B01D 2201/291* (2013.01)
(58) Field of Classification Search
   CPC .......................... B01D 27/08; B01D 2201/291
   USPC ................... 210/348, 437, 438, 457
   See application file for complete search history.

(56) References Cited

U.S. PATENT DOCUMENTS

| 6,146,527 A | 11/2000 | Oelschlaegel |
| 2015/0367265 A1* | 12/2015 | Grass ..................... B01D 35/16 |
| | | 210/232 |
| 2017/0361252 A1 | 12/2017 | Vogt et al. |
| 2018/0328244 A1 | 11/2018 | Ardes |

FOREIGN PATENT DOCUMENTS

| EP | 3249184 A1 | 11/2017 |
| EP | 2956225 B1 | 7/2019 |
| WO | 0213944 A2 | 2/2002 |

OTHER PUBLICATIONS

Bronshtein, I. et al., Chapter 3.3.4 Solids Bounded by Curved Surfaces, Handbook of Mathematics, 5th Edition, 2007, pp. 154-158.
European Patent Office, Extended Search Report, Application No. 22184720.5, Dec. 23, 2022, 9 pages.
PCT International Search Report and Written Opinion, PCT/EP2023/069495, Aug. 28, 2023, 15 pages.

* cited by examiner

*Primary Examiner* — Madeline Gonzalez
(74) *Attorney, Agent, or Firm* — Quarles & Brady LLP; Yakov S. Sidorin

(57) ABSTRACT

A fluid filter cartridge including a filter element forming a fluid channel with a longitudinal axis, a front-end cap sealingly attached to a front side of the filter element, a rear-end cap sealingly attached to a rear side of the filter element, a through hole in the front-end cap, a conduit formed by a conduit wall that is attached to the front-end cap and in fluid communication with the fluid channel via the through hole in the front-end cap. The conduit has a front end facing away from the rear-end cap and n pins ($3 \leq i \leq n$) extending from an inner surface of the conduit wall at azimuthal positions $\varphi_i$ to $\varphi_i + \Delta\varphi_i^s$.

14 Claims, 8 Drawing Sheets

FLUID FILTER AND HOUSING FOR THE FLUID FILTER

CROSS-REFERENCE TO RELATED APPLICATIONS

This US Patent Application is a continuation of the pending International Patent Application No. PCT/EP2023/069495 filed on Jul. 13, 2023, which designates the United States and claims priority from the European Application No. 22184720.5 filed on Jul. 13, 2022. The disclosure of each of the above-identified patent documents is incorporated herein by reference.

BACKGROUND

1. Field of the Invention

The invention relates to components of, e.g., a fluid filter housing and to a fluid filter cartridge, wherein the fluid filter cartridge is preferably configured to be mounted in the fluid filter housing. At least one the fluid filter cartridge and the fluid filter housing has a first cylindrical surface and the respective other of the fluid filter cartridge and the fluid filter housing has a second cylindrical surface. The first and second cylindrical surfaces may be surfaces of a conduit and/or a tube, respectively. The conduit may be the conduit of a fluid filter cartridge and the tube may be the tube of the fluid filter housing. Further, the invention relates to a method for mounting the fluid filter cartridge into the housing.

2. Description of the Related Art

EP 2 956 225 B1 suggests a filter cartridge with a filter element between a front-end cap and a rear-end cap. The filter element forms a fluid channel which is protected against collapsing by a support structure inside the fluid channel. The front-end cap has a through hole enabling a fluid communication of the fluid channel with an inlet tube of a fluid filter socket. The filter cartridge enables a flow of an unfiltered fluid radially inwardly through the filter element, which is filtered while flowing through the filter element. The filtered fluid flows through the fluid channel and the through hole out of the filter cartridge. At the rear-end facing side of the front-end cap is a cylindrical ring being unitary with the support structure and being aligned with the through hole and the filter element. Two pins protrude from the inner surface of the ring radially towards the ring axis. These two pins each have a forward-facing surface being both located in a first plane. Further, these two pins each have a rear-end cap facing surface being both located in a second plane. Both planes are perpendicular to the ring axis. The socket of the housing has a tube with a free distal end for being inserted into the ring of the filter cartridge. The rear-end cap facing end surface of the tube has two recesses. Between these recesses are helical surface portions configured to support a rotation of the filter cartridge around the tube axis until the pins engage into their respective recesses in the rear-end cap facing frontal surface of the tube.

SUMMARY

The problem to be solved by the invention is to provide a first article and a second article which are simple and hence cheap to manufacture while at the same time being configured to be mounted to each other in a predefined azimuthal orientation. Another problem to be solved is to provide a filter cartridge and a filter housing, as well being simple to manufacture and being configured to receive the filter cartridge in a predefined azimuthal orientation.

A solution of the problem is a first article having a first cylindrical surface. Thus, the first article is a conduit or at least similar to a conduit and herein referred to as "conduit", for short). The first cylindrical surface of the conduit may be a peripheral surface of the article, hence the conduit is not necessarily hollow, but it may be. Alternatively, the cylindrical surface may delimit a hollow space of the article, in this case, the conduit is hollow and may preferably have at least an open front-end. The other end may be open or closed. In case the first surface delimits a hollow space, there are not restrictions to the shape of the peripheral surface, it can be designed to meet any requirement, be technical and/or aesthetical. Thus, the term conduit or conduit like structure is a synonym for "a first article having a first cylindrical surface", in this sense the article resembles a straight conduit, and we use the term conduit only for simplicity and because it is more vivid than "a first article having a first cylindrical surface". In this sense "a/the conduit" may be considered as pars pro toto for "a/the first article having a first cylindrical surface", regardless of whether the surface is a peripheral surface or faces towards a longitudinal axis of the conduit.

As will be explained in more detail below, the conduit and a tube may be mounted to each other. The tube and/or the conduit may be integrated into and/or included by a filter cartridge of claim 11 or 12 and/or a filter housing of claim 13. Like the term conduit can be replaced by "first article", throughout the entire description, the term tube can be replaced herein by "second article with a second cylindrical surface". In this sense, conduit and tube are each a pars pro toto of the respective superordinate terms. None of these is necessarily hollow or necessarily fluid tight or necessarily configured to enable a fluid flow, but as the usage of the terms conduit and tube implies, the conduit and/or tube may be.

The fluid filter cartridge may have a filter element forming a fluid channel with a longitudinal axis. These filter elements are well known and have of a porous material, enabling fluid molecules to pass the filter element, while particles above a given size are held back. These filter elements are widely used and commercially available, while often being made from plied filter paper. A front-end cap and a rear-end cap may be sealingly attached to a front side and to a rear side, respectively of the filter element. Fluid being filtered may thus pass between the front-end cap and the rear-end through the filter element, e.g. radial inward (from the outside into the fluid channel). Filtered fluid may leave the fluid channel via at least one through hole in the front-end cap and/or the rear-end cap.

In an example, the conduit may have a conduit wall with the first cylindrical surface enclosing a through hole of the conduit. The conduit wall may be attached for example to the front-end cap and may be in fluid communication with the fluid channel via the through hole in the front-end cap. Hence the conduit may have a front-end facing away from the rear-end cap and the rear-end of the conduit may face towards the rear-end cap. Filtered oil (being an example fluid herein) may thus flow from the fluid channel through the through hole of the conduit to wherever it is needed.

The conduit may have a number of n pins attached to it, n being an integer, e.g. greater that 4 and/or greater than 5 and/or greater than 6 and/or greater than 8, and/or greater than 10. These n-pins may each extend from an inner surface of the conduit wall towards the conduit axis and/or from the outer peripheral surface of the conduit wall away from the conduit axis. Each of the pins may span an azimuthal angle $\Delta\varphi_i^s$, as well referred to herein as azimuthal span $\Delta\varphi_i^s$, wherein the index i identifies the pins, i.e. $1 \le i \le n$. For example, $\Delta\varphi_1^s$ may be the azimuthal span of the first pin, $\Delta\varphi_2^s$ may be the azimuthal span of the second pin and so forth. Generalizing, $\Delta\varphi_i^s$ may denote the azimuthal span of the $i^{th}$ pin.

The azimuthal span $\Delta\varphi_i^s$ can be considered as an azimuthal extension. In other words, a rotation of the conduit by an azimuthal span $\Delta\varphi_i^s$ around the conduit's longitudinal axis shifts a first azimuthal boundary of a pin i to the azimuthal position of the other azimuthal boundary of the same pin i prior to the rotation. Thus prior to the rotation, each $i^{th}$ pin may extend ('span') in azimuthal direction from a first azimuthal position $\varphi_i$ to a second azimuthal position $\varphi_i + \Delta\varphi_i^s$. Again, it is noted that the index i indicates the number of the corresponding pin, i.e., $1 \le i \le n$. Herein, we assume that the pins are numbered in an ascending order in the azimuthal direction. Hence the $i^{th}$ pin is assumed to be an azimuthal neighbor of the $(i+1)^{th}$-pin for all $1 \le i < n$ and the $n^{th}$ pin is assumed to be an azimuthal neighbor of the first ($i=1$) pin (and of course of the $(n-1)^{th}$ pin). The azimuthal distance between two pins i, i' is referred to as $\Delta\varphi_{i,i'}^d$. Accordingly, the azimuthal position $\varphi_{i+1}$ of the $(i+1)^{th}$-pin is given by $\varphi_{i+1} = \varphi_i + \Delta\varphi_i^s + \Delta\varphi_{i,i+1}^d$, $\forall 1 \le i \le n-1$. It comes without saying that the azimuthal position $\varphi_1$ of the first pin is $\varphi_1 = \varphi_n + \Delta\varphi_n^s + \Delta\varphi_{n,1}^d$. Of course, once per turn, one has to subtract $360° = 2\pi$, i.e. assuming $\varphi_1 = 0°$, then $\varphi_1 = \varphi_n + \Delta\varphi_n^s + \Delta\varphi_{n,1}^d - 2\pi$.

As usual in the field of mechanical engineering, the azimuthal distance is the distance between two points in azimuthal direction which can be determined easily as the difference of the azimuthal component of their coordinates (assuming cylinder coordinates).

In a preferred example $\Delta\varphi_i^s = (1 \pm \alpha_a) \cdot a$, $\forall 1 \le i \le n$, a being a constant and $\alpha_a$ is an error margin selected from the set A, with $A = \{0.25, 0.2, 0.15, 0.1, 0.05, 0.025, 0.01, 0\}$, i.e. $\alpha_a \in A$, $\alpha_a$ is preferably small, particularly preferred $\alpha_a = 0$. In addition or alternatively, $\Delta\varphi_{i,i+1}^d = (1 \pm \alpha_b) \cdot b$, $\forall 1 \le i < n$, b being a constant, $\alpha_b \in A$, preferably $\alpha_b \le 0.1$, particularly preferred $\alpha_b = 0$. Again, as usual in the field of mechanical engineering $x = y \pm \delta$ is a short form for $|y| - |\delta| \le |x| \le |y| + |\delta|$ and hence $\Delta\varphi_{i,i+1}^d = (1 \pm a_b) \cdot b$ means $(1 - |a_b|) \cdot |b| \le \Delta\varphi_{i,i+1}^d \le (1 + |a_b|) \cdot |b|$, or in other words within a relative error margin of $\pm a_b$, $\Delta\varphi_{i,i+1}^d$ equals b, so to speak $\Delta\varphi_{i,i+1}^d \approx b$.

Particularly preferred, the azimuthal spans and the azimuthal distances are of at least approximately the same size, hence preferably $\Delta\varphi_{i,i+1}^d = (1 \pm \alpha_\varphi) \cdot \Delta\varphi_i^s \forall 1 \le i < n$ and $\alpha_\varphi \in A$, wherein smaller $\alpha_\varphi$ are preferred.

The n pins may each have a forward-facing surface, i.e. a surface facing away from the rear-end cap. Preferably, the distances $d_i$ in axial direction between the forward-facing surfaces and a reference plane either increase or decrease with the respective azimuthal position $\varphi_i$ of each $i^{th}$-pin by $\Delta d_{i-1,i}$ from the $(i-1)^{th}$-pin to each $i^{th}$-pin for all $1 < i \le n$, thus, $d_{i+1} = d_i + (1 + \alpha_d) \cdot \Delta d_{i,i+1}$, $\Delta d_{i,i+1} \ne 0$, $\forall 1 \le i < n$ and $\alpha_d \in A$ wherein $\Delta d_i := \Delta d_{i-1,i} \forall 1 < i \le n$ and $\Delta d_1 := \Delta d_{n,1}$. An increase of the axial distances $d_i$ implies that $\Delta d_{i,i+1} > 0$, $\forall 1 \le i < n$ and correspondingly a decrease $\Delta d_{i,i+1} < 0$, $\forall 1 \le i < n$. Thus, the distance $d_i$ strictly monotonically increases or decrease as a function of the azimuthal position $\varphi_i$. Only to allow simple referencing and to explain the concept, $\Delta d_{i,i'}$ is the distance between the front facing surfaces of the $i^{th}$ pin and the $i'^{th}$ pin, where $1 < i \le n$ and $1 < i' \le n$, i.e. $\Delta d_{i,i} = 0 \forall i$. The distance $\Delta d_{n,1}$ in the axial direction between the front facing surface of the $n^{th}$-pin to the front facing surface of the first pin is preferably given by $\Delta d_{n,1} = -(1 \pm \alpha_{dn})\Sigma_{i=1}^{n-1} \Delta d_{i,i+1}$, $\alpha_{dn} \in A$, wherein smaller $\alpha_{dn}$ are preferred.

The reference plane is perpendicular to the longitudinal axis and preferably either at the front or at rear side of all n pins. The axial position of the reference plane is selected only for conceptual simplicity. Generally, the reference plane could as well be in between of the first and the $n^{th}$-pin, but then the meaning of the signs indicating the direction of the distances $d_i$ and the axial shift $\Delta d_{i,i+1}$ alters when transitioning the reference plane. As already apparent, $\alpha_{dn}$ is an error margin and an element that can be selected from $A = \{0.25, 0.2, 0.15, 0.1, 0.05, 0.025, 0.01, 0\}$, i.e. $\alpha_{dn} \in A$. The symbol "±" denotes as usual that $\Delta d_1$ is in between $-(1 - \alpha_{dn})\Sigma_{i=1}^{n-1}\Delta d_{i,i+1}$ and $-(1 + \alpha_{dn})\Sigma_{i=1}^{n-1}\Delta d_{i,i+1}$, thus $-(1 - \alpha_{dn})\Sigma_{i=1}^{n-1}\Delta d_{i,i+1} \ge \Delta d_{n,1} \ge -(1 + \alpha_{dn})\Sigma_{i=1}^{n-1}\Delta d_{i,i+1}$. This axial shift $\Delta d_{i,i+1} = \Delta d_i$ has the effect that the filter cartridge can be rotated relative to a tube extending at least partially in the conduit or in which the conduit at least partially extends while being shifted in the forward direction until the first or the $n^{th}$-pin (depending on the sign of $\Delta d_n$) abuts in azimuthal direction against a protrusion on the peripheral surface and/or on the inner surface, respectively of the tube. However, a rotation in the opposite direction is blocked. Thus, when mounting the tube and conduit by inserting one into the other, these can be rotated towards an intended azimuthal orientation, but not in the opposite direction. Installation of parts requiring a predefined azimuthal orientation, like for example a filter cartridge is simplified. In the example of a filter cartridge having a front-end cap with the conduit, manufacturing of the conduit and thus of the front-end cap is vastly simplified because the front-end cap including the conduit can be manufactured by injection molding while obliviating the need for additional sliders in the mold. Further, installation of the filter cartridge is fail safe as the filter cartridge, if not rotated to the intended position, prevents the filter housing from being fully closed.

As already apparent from the above, the pins and the protrusions preferably extend at least essentially into opposite directions from opposed surfaces of the conduit and the tube towards their respective counterpart, if the tube is at least partially inserted into the conduit or the conduit is at least partially inserted into the tube. For example, if the conduit is configured to receive the tube, the pins may extend at least essentially radially inwards from the inner surface of the conduit wall. In another example the conduit may be configured to be received at least partially by the tube and in this another example, the pins may extend at least essentially radially outwards from the peripheral surface of the conduit wall. Similarly, if the tube is configured to receive at least a portion of the conduit, the protrusions extend preferably from the inner side of the tube wall at least essentially towards tube axis. If the tube is configured to be received at least partially by the conduit, the protrusions are preferably on the peripheral surface of the tube and extend at least essentially radially outwards.

In a preferred example, the azimuthal distance $\Delta\varphi_{n,1}^d$ between the $n^{th}$ pin and the first pin is greater (>) than the maximum azimuthal distance $\Delta\varphi_{i,i+1}^d$ between any other pair of neighbored pins i, i+1, $1 \le i < n$. Thus $\Delta\varphi_{n,1}^d > \text{Max}(\{\Delta\varphi_{i,i+1}^d: 1 \le i < n\})$. Thereby, it can be assured that the conduit can be further advanced towards the tube only in the intended azimuthal orientation. This is further enhanced, if the optional complementary protrusion blocking the further rotation has an azimuthal span $\Delta\varphi_1^s$ being greater than Max($\{\Delta\varphi_{i,i+1}^s: 1 \le i < n\}$) and smaller $\Delta\varphi_{n,1}^d$. During the rotation, the pins may so to speak slide over the read-end cap facing surface of the protrusion, assuming the conduit is attached to or integrated in a front-end cap, which is only an illustrative example enabling vividly reference a forwards and backward (rear) direction.

Preferably, at least a portion of the front-end facing surfaces of the pins may be inclined in the azimuthal direction. This measure enhances sliding of the pins relative to the protrusions. The inclination preferably has as a slope $$s_i = (1 \pm \alpha_s) \frac{\Delta d_i}{\Delta \varphi_{i+1} - \Delta \varphi_i}, \forall\, 1 < i \leq n$$

wherein $\alpha_s \in A$, particularly preferred is $\alpha_s = 0$.

As already apparent, the pins have side surfaces facing in the two opposed azimuthal directions. Preferably, the first pin and the $n^{th}$-pin each have an azimuthal abutment wherein the two abutments face towards each other. These abutments can for example be formed by at least a portion of the opposed side surfaces of two respective pins. These abutments enable to center a protrusion with an azimuthal span smaller or equal than ($\leq$) the azimuthal distance between the two pins, being explained below in more detail. The protrusion may, e.g. be located on a peripheral surface of a tube configured to be inserted into the conduit as explained above.

In a preferred example, the axial distances $\Delta d_i = \Delta d_{i,i+1}$ between the $i^{th}$- and the $(i+1)^{th}$-pin may be at least essentially constant (within a relative error margin $\pm \alpha_c$, $\alpha_c \in A$) for all pins except of course for the distance between the last ($n^{th}$-) pin to the first ($i=1$) pin. In a more concise manner one may reformulate this as $\Delta d_i = (1 \pm \alpha_c) \cdot c_d$, $\forall 1 \leq i < n$, $c_d$ being a constant.

Another aspect of the invention is, in an embodiment, a tube of a filter socket to which a filter cartridge, e.g. a filter cartridge with at least one of the above described features may be attached to. In other the filter cartridge may be attached to the tube. In practical applications these filter sockets are often a part of a filter housing, and they may even be integrated in a filter housing for a filter cartridge, in particular for a filter cartridge as described above.

The filter housing may have a housing bottom and a housing cover. The housing cover may preferably be removably attached to the bottom. The housing cover and the housing bottom may enclose a space configured to receive the filter cartridge. In practice, one may open the filter housing, may (if present) remove a previously inserted filter cartridge, may insert another or the same filter cartridge and may close the housing cover again. As indicated, the removing step is optional, for example, it is necessarily omitted if the filter housing is already empty.

The filter socket may be located inside the filter housing and may have a tube with a free end. The tube may have a peripheral surface and/or a fluid opening configured for receiving fluid from the filter cartridge. Of course, the fluid flow may be reversed. Herein, only for a more vivid presentation, we assume the fluid to flow through the filter element into the fluid channel and from there into fluid inlet of the tube. If the fluid flow is reversed, the fluid inlet becomes a fluid outlet, hence the term "fluid inlet" is only a vivid example of the term "fluid opening", the latter term leaving the flow direction open. The tube may have a tube axis and at least a first protrusion extending from the peripheral surface in an outward direction or from an inner surface at least essentially towards the tube axis. As already apparent from the above, the tube can as well be used in other applications and the described integration into a filter housing is only an example for a practical application of embodiments of the invention.

The first protrusion may have an azimuthal span $\Delta \phi_1^s$, e.g. at a rear-end of the corresponding conduit facing surface. In a preferred example, the azimuthal span $\Delta \phi_1^s$ is greater or equal ($\geq$) than the azimuthal distance $\Delta \varphi_{i,i+1}^d$ between the pins of the conduit for all $i+1 \leq n$. Further, the azimuthal span $\Delta \phi_1^s$ may be smaller (or equal) than (or to) the azimuthal distance between the $n^{th}$- and the first pin, i.e., $\Delta \phi_1^s \leq \Delta \varphi_{n,1}^d$. Accordingly, the first protrusion may fit only in the azimuthal spacing between of the $n^{th}$-pin and the first pin of the conduit. The axial dimension of the protrusion may preferably be configured to abut the two mutually opposing azimuthal surfaces of the $n^{th}$-pin and the first pin. Hence, the axial dimension $l_1$ of the first protrusion (as well referred to as the first length $l_1$) is preferably in the order of $|\Delta d_{n,1}|$, wherein in the order of may be understood as $(1-\alpha_l) \cdot |\Delta d_{n,1}| \leq l_1 \leq (1+\alpha_l) \cdot |\Delta d_{n,1}|$ or briefly $l_1 = (1 \pm \alpha_l) \cdot |\Delta d_{n,1}|$ wherein $\alpha_l \in A$.

In a particularly preferred example, the first length $l_1$ may be greater than $|\Delta d_{n,1}|$ minus the axial length of the first pin or of the $n^{th}$-pin, depending on which of these is further away from the rear-end, i.e. minus the axial length of those of these two pins being farther to the rear-end cap. If $l_f$ is the axial length of that pin of these two pins being farther from the rear-end, than $l_1$ obeys preferably $l_1 > |\Delta d_{n,1}| - l_f$ or preferably at least $l_1 \geq |\Delta d_{n,1}| - l_f$.

Preferably, tube has a number of m−1 further protrusions, which protrude from the peripheral surface of the tube and/or from the inner surface of the tube, wherein each of the protrusions may have a set of associated azimuthal angles $\beta_j$: $\phi_j \leq \beta_j \leq \phi_j + \Delta \phi_j^s$ and in that $\phi_i + \Delta \phi_i^s \leq \beta_j \leq \phi_{i+1}$, $\forall 1 \leq i < n$, $1 \leq j \leq m$, if the tube axis and the conduit axis are aligned and if the tube and the conduit are oriented to obey the condition $\phi_1 + \Delta \phi_1^s = \varphi_1$. In other words, there may be a number of m protrusions. If the first protrusion is counted as well, the azimuthal spans $\Delta \phi_j^s$ of each of these protrusions as well as their locations $\phi_j$ may be selected to ensure that the cartridge can be advances if (and only if) the space between the $n^{th}$ pin and the first pin is azimuthally positioned to match the azimuthal position of the first protrusion. The ranges $\beta_j$ over which the protrusions span can be considered as a code which has to be matched by the azimuthal positions and azimuthal spans of the pins. As already apparent, the index j indicates the $j^{th}$ protrusion to which the value (range, position span, etc.) is associated.

Particularly preferred, the distally facing surfaces of the protrusions, i.e. the surfaces facing towards the rear-end of the conduit (if the tube is mounted) may each have a distance $\delta_j$ from the position of the reference plane and a slope of the protrusions $s_t$, with $$s_t = \frac{\delta_j - \delta_{j'}}{\phi_j - \phi_{j'}}$$

$$(\forall\, j > j',\, 2 \leq j \leq m)$$

may be at least essentially (i.e. with a percentage, e.g. within $\pm \alpha_{st}$, $\alpha_{st} \in A$) the slope $s_c$ of the pins of the conduit, being $$s_c = \frac{d_i - d_{i'}}{\varphi_i - \varphi_{i'}}, \forall\, i > i',\, 2 \leq i \leq n,$$

or briefly $(1\pm\alpha_{st})\cdot s_p=s_c$.

There may be a second reference plane being orthogonal to the tube axis. Thus, if the conduit and/or the filter cartridge is attached to the tube and/or the socket, the first and the second reference planes may be oriented at least essentially parallel to each other (which shall include that both planes become identical in case the filter cartridge reaches its axial end position). At least essentially parallel means that parallelism is preferred, but small deviations can be accepted, e.g. deviations smaller than 15°, smaller than 10°, smaller than 5°, smaller than 2.5° or deviations smaller than 1° may be accepted.

Particularly preferred, the axial positions of the distally facing surfaces of the protrusions may be spaced from each other such that at least two distally facing surfaces each abut at least a front facing surface of a pin, if the condition $\varphi_n+\Delta\varphi_n\leq\beta_1\leq\varphi_1$ is not met. Thereby, during adjustment of the azimuthal orientation of the filter cartridge, the longitudinal axis of the conduit may be at least essentially aligned to the tube axis, thereby reducing the risk that the pins and the protrusions are jammed, which may result in blocking the filter cartridge from being properly oriented and/or axially advanced towards its intended position.

As already apparent, the filter housing and the filter cartridge may be combined to form a liquid filter system. The corresponding method may include at least one of the following steps:
- inserting the free end of the tube via the through hole into the fluid channel of the filter element;
- pushing the front-end cap towards the socket until at least one of the pins abuts with its forward-facing surface against a distally facing surface of a protrusion;
- while pushing the front-end cap towards the socket, the filter cartridge may be rotated until further rotation is blocked.

Subsequently one may close the housing cover. Prior to the inserting step one may, if required remove or open the housing cover and remove an already installed filter cartridge, if one is installed.

Once a further rotation of the cartridge is blocked one may push the cartridge axially until the cartridge abuts an axial block.

Above, the embodiments of the invention have been described assuming that the pins are on a surface of the conduit and that the protrusions are on a surface of the tube. But the pins could as well be on surface of the tube and the protrusions on a pin facing surface of the conduit. The interaction of the pins and the protrusions would not be altered. The terms first surface of the conduit and second surface of the tube have only be chosen to be able to verbally distinguish these preferably cylindrical surfaces.

A cylindrical surface is as usual a surface resembling a cylinder surface. Generally, one may say that a cylindrical surface is at least in part congruent to at least a part of a cylinder surface. Further, it is noted that it is preferred but not required that cylindrical surfaces herein are circular cylindrical surfaces, i.e. at least a portion of the respective circular cylindrical surface is congruent to at least a part of a circular cylinder surface. For a commonly accepted definition of a cylinder, please see *Handbook of Mathematics* Bronshtein, Semendyayev Musiol and Muehlig, 5$^{th}$ ed., Springer Berlin Heidelberg New York, 2007; ISBN 978-3-540-72121-5, therein Chapter 3.3.4 (pages 154ff).

BRIEF DESCRIPTION OF THE DRAWINGS

In the following, the invention will be described by way of example, without limitation of the general inventive concept, on examples of embodiment and with reference to the drawings.

Figure 1:
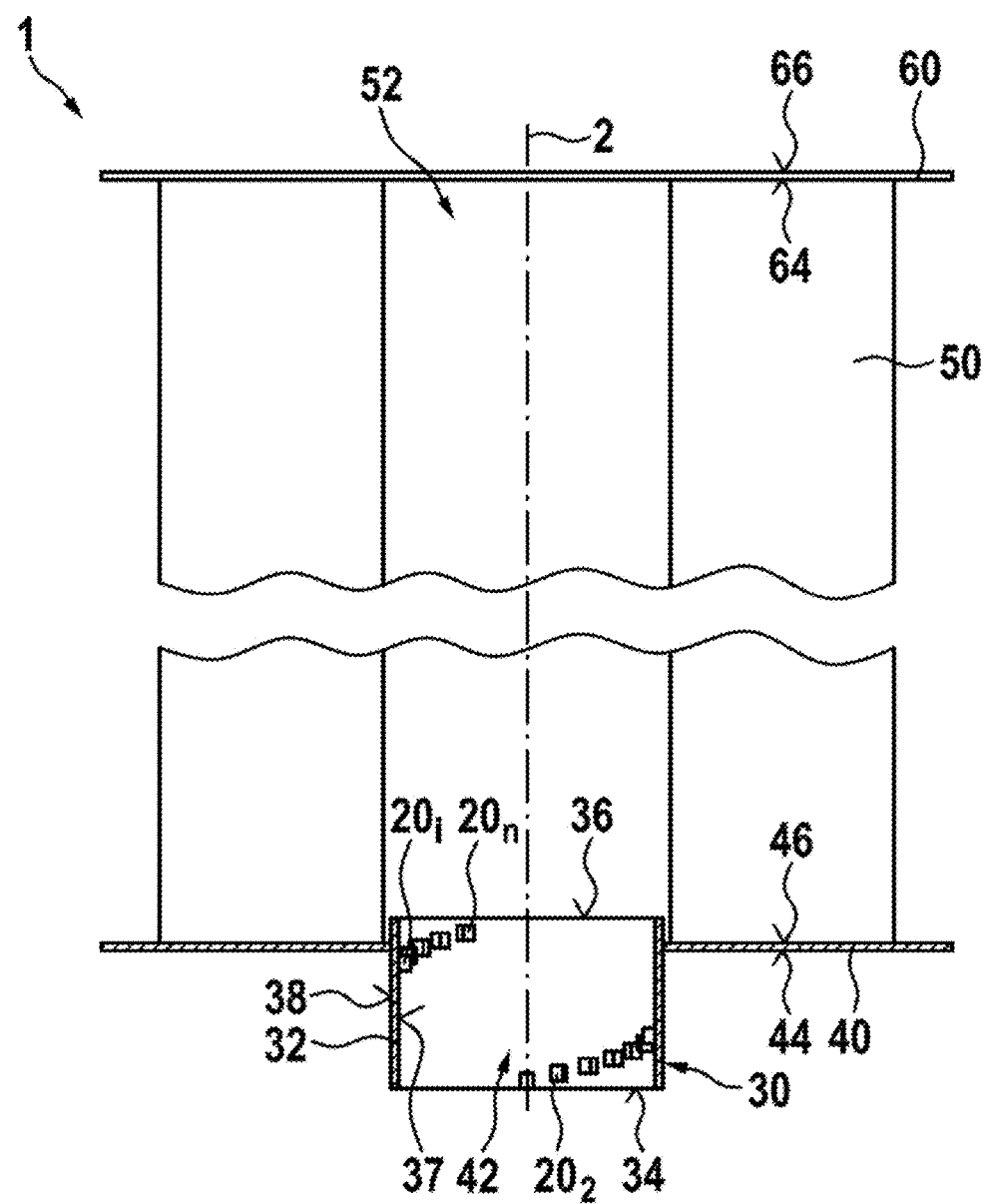
FIG. 1 shows a sectional view of a filter cartridge with a conduit.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

The filter cartridge 1 in FIG. 1 includes a filter element 50 enclosing a fluid channel 52 having a longitudinal axis 2. Herein this longitudinal axis is considered as the filter axis 2. The filter element 50 can be for example of plied filter paper as commonly used, e.g. for oil filter cartridges or any other suitable filter material. The filter element 50 has e rear-end side, which is attached to the forward-facing surface of a rear-end cap 60. The frontal side of the rear-end cap 60 facing away from the front-end side is hence referred to as rearward facing side 66 of the rear-end cap 60. In this example, the rear-end cap 60 is represented by a simple disk, but it may as well have through holes, valves, attachment means or the like as known in the art. As shown, the front-end side of the filter element 50 may be attached to a rearward facing side 46 of a front-end cap 40. The front-end cap 40 may have a through hole 42 enabling filtered fluid to leave the fluid channel 52. A conduit 30 being defined by a conduit wall 32 may be attached to the front-end cap 40 and encircles the through hole 42. In other words, the inner surface 37 of the conduit 10 may define the through hole 42. Similar to the front-end cap 40, the conduit 30 may have a front facing surface 34 and a rearward facing surface 36.

At this point it is noted that in this example the tube axis 2 and the filter axis 2 coincide, but this not necessarily the case as explained in detail in EP 3 249 184 and in the depicted example this alignment has been chosen only because of its conceptual simplicity.

Figure 2:
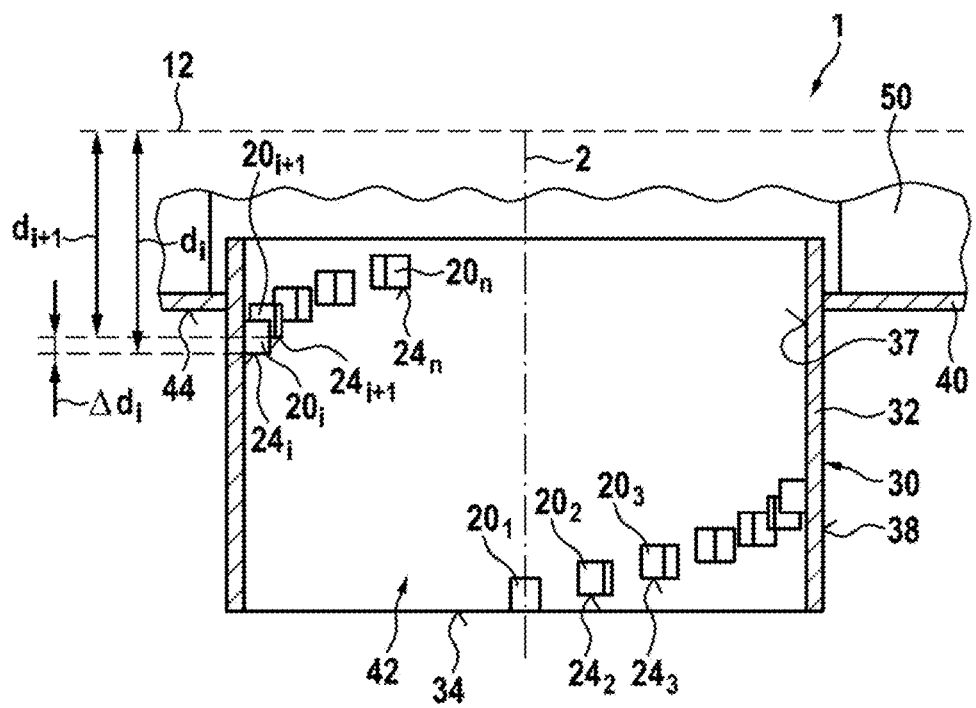
FIG. 2 shows a cross section of a conduit of the cartridge.
Figure 3:
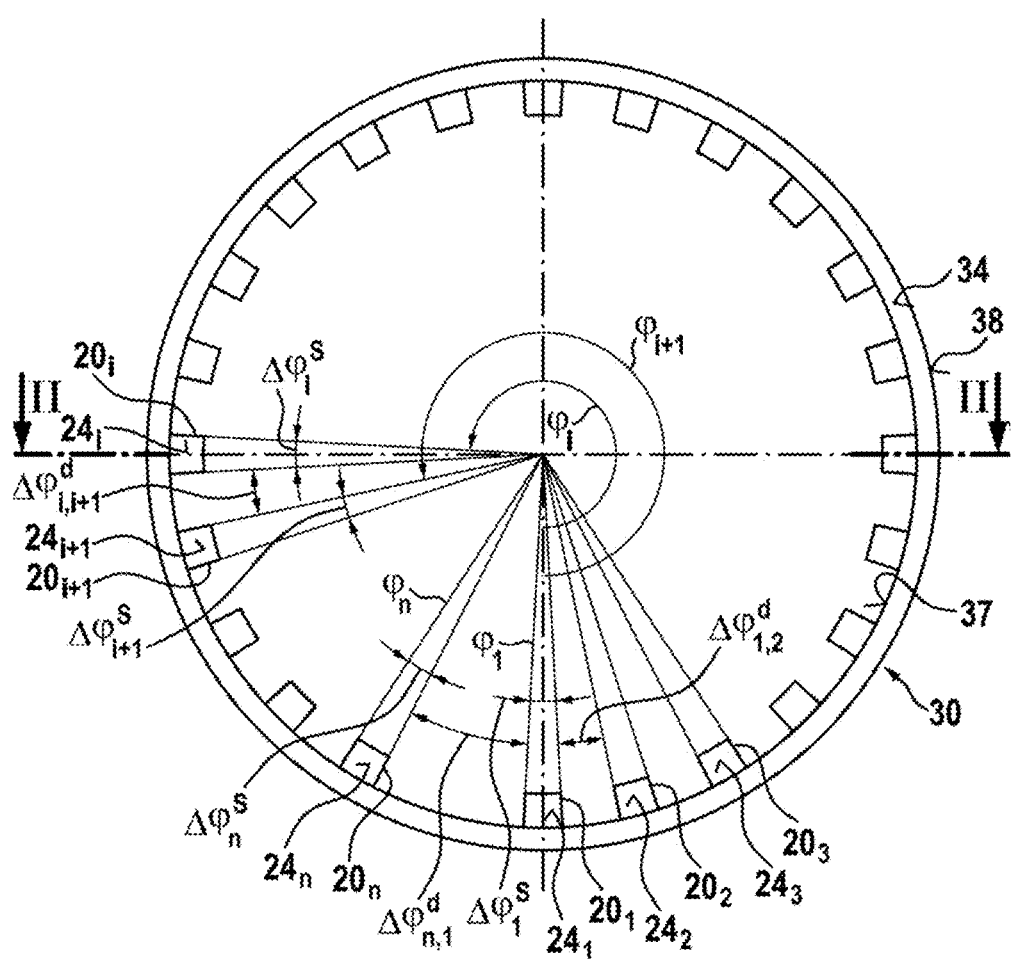
FIG. 3 shows a front view of the conduit of FIG. 2

A number of n pins $20_1, 20_2, 20_3, \ldots, 20_i, \ldots, 20_n$ may protrude from the inner surface 37 of the conduit wall 32 into the free space being enclosed by the conduit wall 32 (see as well FIG. 2 and FIG. 3). Each pin $20_i$ ($1\leq i\leq n$) may have a forward-facing surface $24_i$ and at its opposite side a rear-end facing surface $26_i$. As shown, the front-end facing surfaces $24_i$, $24_{i+1}$ of two neighbored pins $20_i$ and $20_{i+1}$ ($\forall 1\leq i<n$) may be spaced from each other by a distance $\Delta d_i$ (see FIG. 2). Thus, relative to a reference plane 12, the distances $d_i$ of the front facing surfaces $24_i$ may decrease with increasing index i. Generally, the reference plane may be placed on the other side of the pins $20_i$, in this case the distances $d_i$ would decrease. The position of the reference plane is not relevant, but regardless of the choice, the distances should all increase or all decrease when increasing i from 1 to n, assuming the first pin to be either the one closest to the front-end or the closest to the rear-end of the conduit.

In addition, as can be seen in FIG. 2 and FIG. 3 the pins $20_i$ may be azimuthally spaced from the front-end and may be aligned with the longitudinal axis 2. $\varphi_1$ may be the angle at which the first protrusion (i=1) starts. The first protrusion $20_1$ may then extend or span azimuthally by a 'span' $\Delta\varphi_1{}^s$. After an azimuthal distance $\Delta\varphi_{1,2}{}^d$ the next pin $20_2$ may protrude out of the inner surface 37 or the conduit wall 32, i.e. at an angle $\varphi_2$. Generalizing, a pin $20_i$ may extend at each azimuthal position $\varphi_i$. The pin $20_i$ may have an azimuthal thickness ('span') $\Delta\varphi_i{}^s$. In this example in the clockwise direction, this pin $20_i$ is followed by a pin $20_{i+1}$ (, but of course the direction could be inverted) and the azimuthal spacing (the azimuthal gap) between the $i^{th}$ pin $20_i$ and its subsequent $(i+1)^{st}$-pin $20_{i+1}$ is the gap $\Delta\varphi_{i,i+1}{}^d$. Hence the $(i+1)^{st}$-pin 'starts' (or ends, depending on the preferential direction) at $\varphi_{i+1}=\varphi_i+\Delta\varphi_i{}^s+\Delta\varphi_{i,i+1}{}^d$, $\forall 1\leq i<n$. As can be seen in FIG. 3, $\Delta\varphi_{n,1}{}^d$ is much bigger than all $\Delta\varphi_{i,i+1}{}^d$. Preferably, $\Delta\varphi_{n,1}{}^d \geq \text{Max}(\{\Delta\varphi_{i,i+1}{}^d: 1\leq i<n\})$. This azimuthal gap $\Delta\varphi_{n,1}{}^d$ between the $n^{th}$-pin $20_n$ and the first pin $20_1$ ensures that when inserting the conduit (which may be a part of a filter cartridge 1) it may slide with the front facing surfaces $24_i$ on any protrusion having an azimuthal span $\Delta\phi_j{}^s$ greater than $\text{Max}(\{\Delta\varphi_{i,i+1}{}^d: 1\leq i<n\})$ and preferably smaller than the gap $\Delta\varphi_{n,1}{}^d$, thereby being guided into a defined azimuthal orientation. Preferably, the protrusion $120_1$ (see FIG. 4A) may have an axial span $\Delta\phi_1{}^s$ greater than the axial distance $\Delta\varphi_{n,1}{}^d$ between the first and the $n^{th}$-pin $20_n$ and the first pin $20_1$ and/or may have an azimuthal abutment closing the axial gap between the first pin $20_1$ and the $n^{th}$-pin $20_n$. The abutment may be a separate part, only for conceptual simplicity, we attributed the abutment to the first pin, as the abutment delimits a rotation in the direction from $\varphi_n$ to $\varphi_i$ beyond $\varphi_i$.

This mechanism of azimuthally orienting the conduit 30 and hence any part including the conduit (e.g., the filter cartridge 1 of FIG. 1) relative to the tube 130 another part is visualized in FIG. 4A to FIG. 4E: In FIG. 4A to 4E: There is the tube 130 has a tube axis 102 being aligned with a conduit axis 2. The tube 130 may have a peripheral surface 138 with a radius smaller or equal ($\leq$) to the free radiuses $r_i$ of the conduit 30. Thus, when inserting the tube 130 into the conduit 30, the tube 130 has a rearward facing side 136 and is at least approximately centered in the conduit 30 by the radially inwardly facing surfaces of the pins $20_i$. In FIG. 4A to 4E only the pins $20_i$ of the conduit are depicted to visualize their interaction with protrusions 120; extending radially outwardly over the free radius $r_i$ of the conduit from the peripheral surface of the tube 130.

Figure 4A:
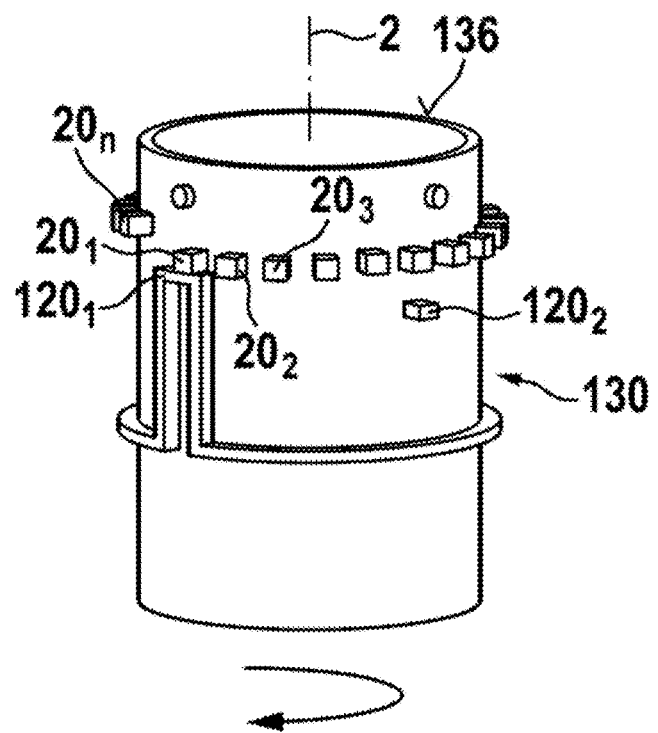
FIG. 4A to 4E show a tube of a filter housing interacting with pins of a cartridge.
Figure 4B:
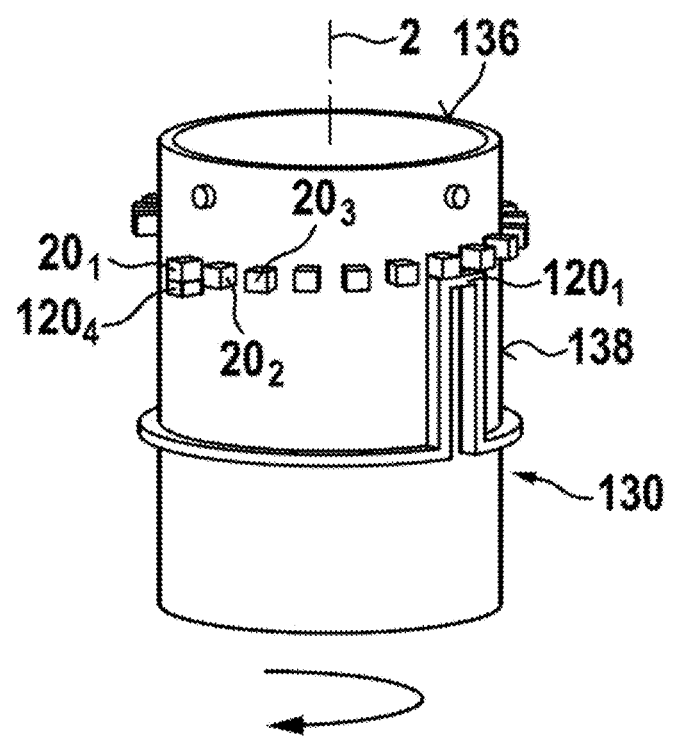
Figure 4C:
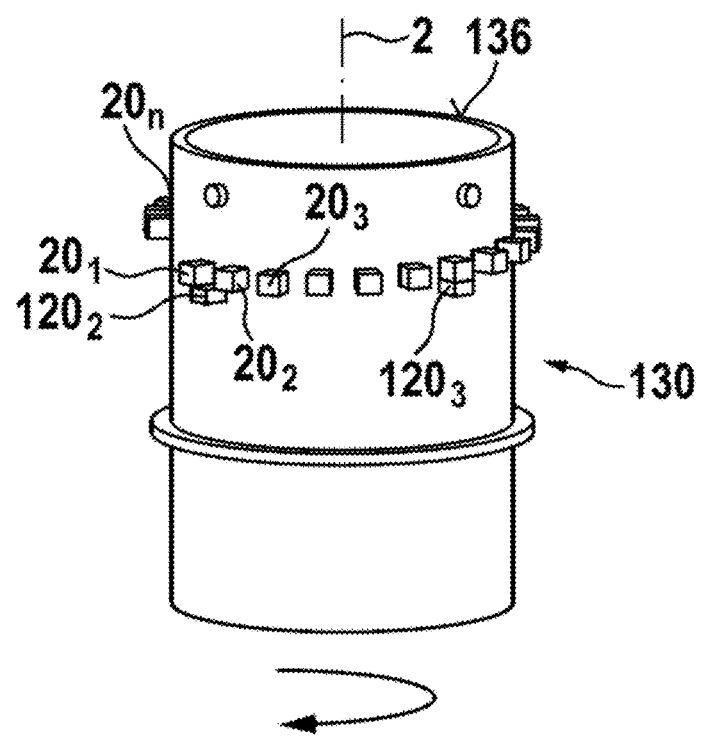

FIG. 4A shows a situation, when a conduit 30 (which may be a part of a filter cartridge 1) with the pins $20_i$ extending into the through hole 42 is positioned over the tube 130, which may be part of a socket of a filter housing. As shown in FIG. 4A, the conduit 30 may be advanced in the forward direction 3 (see arrow in FIG. 4E) until the at least one front-end side $24_i$ of a pin $20_i$, i.e. the forward-facing surface $24_i$ of a pin $20_i$, abuts the rear-end facing side $126_j$ of an $j^{th}$-protrusion $120_j$ having an azimuthal span $\Delta\phi_j{}^s$ being greater than $\text{Max}(\{\Delta\varphi_{i,i+1}{}^d: 1\leq i<n\})$. In the depicted example, by chance, an axial movement of the conduit 30 in the forward direction is blocked by the rear-end facing side $126_1$ of the first protrusion $120_1$ abutting the forward-facing surface 241 of the first pin $20_1$. While applying a slight force in the forward direction 3, one may rotate the filter conduit 30 relative to the tube 130 in the direction being indicated by a bent arrow. As can be seen in FIG. 4B, the pins $20_i$ slide over the first protrusion $120_1$. After a given rotation, the forward-facing side of the first pin $20_1$ may slide on the rear-end facing side $126_2$ of an optional second protrusion $121_2$. In this preferred example, the second protrusion $121_2$ optionally has an axial offset corresponding to the slope $$s_i = (1 \pm \alpha_s)\frac{\Delta d_i}{\Delta\varphi_{i+1} - \Delta\varphi_i}$$

of the pins $20_i$, Further, if optional protrusions $120_j$ are positioned accordingly (, as shown in FIG. 4C as protrusions $120_2$, $120_3$), the front facing sides $24_i$ of the pins $20_i$, may slide on or over the rear-end facing surfaces $126_j$ of the protrusions $120_j$.

The conduit 30 may slide on the protrusions $120_i$, until a side face of the first pin $20_1$ abuts a side face of the first protrusion $120_1$. So to speak, the sides faces mutually limit a further rotation of the conduit as depicted in FIG. 4E.

Figure 4D:
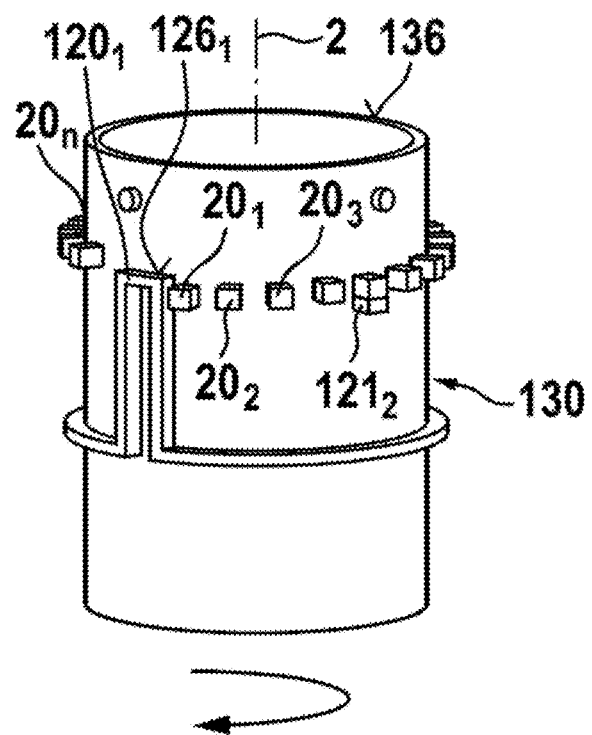
Figure 4E:
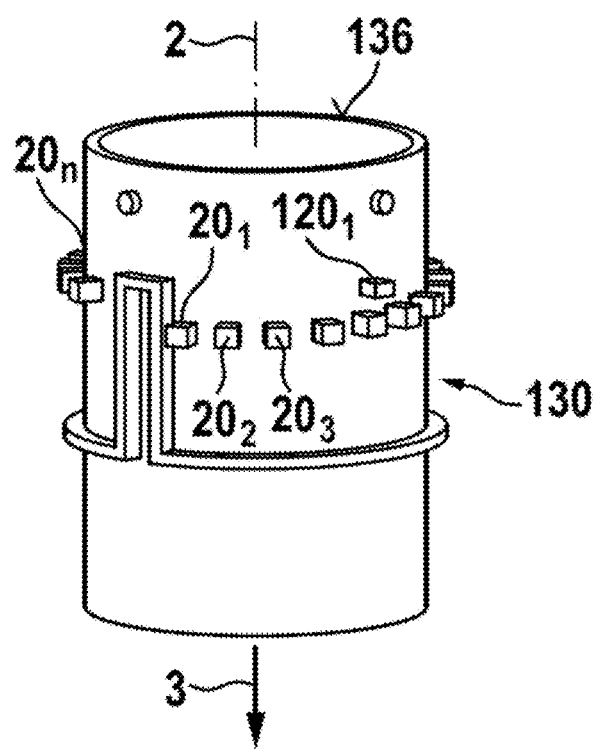

Next, as can be seen in FIG. 4D, the pins $20_i$ may be moved forward (being indicated by the arrow 3) in to its final position, because the first protrusion $120_1$ is aligned with the largest azimuthal gap $\Delta\varphi_{n,1}{}^d$, which is (in this example) in between of the $n^{th}$-pin $20_n$ and the first pin $20_1$. The other protrusions $120_2$ to $120_m$ are preferably smaller than the azimuthal gaps $\Delta\varphi_{i,i+1}{}^d$ between the corresponding pins $20_i$, $20_{i+1}$. Further, the remaining protrusions $120_2$ to $120_m$ (in this example m=4, but other values of m can be used as well) are each azimuthally positioned to 'match' with a space between two neighbored pins $20_i$. This means that if the mutually opposing side surfaces of the first pin $20_1$ and the first protrusion $120_1$ abut, the axial projections of the rear-end facing surfaces $126_j$ in the rearward direction (being opposite to the arrow 3 in FIG. 4E indicating the forward) do not interfere with the position of a pin $20_i$. Further, forward projections of the front facing surfaces $24_i$ do not interfere with the protrusions $120_j$.

It will be appreciated to those skilled in the art having the benefit of this disclosure that this invention is believed to provide a conduit for a fluid filter cartridge as well as for a filter cartridge housing, a fluid filter cartridge and a filter cartridge housing. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 filter cartridge
2 longitudinal axis
12 reference plane $20_i$ pins ($1 \leq i \leq n$)
$24_i$ forward-facing surface of the $i^{th}$ pin/surface of the $i^{th}$-pin facing away from the rear-end cap
$25_i$ radially inwardly facing surface of the $i^{th}$ pin
$26_i$ rear-end cap facing surface of the $i^{th}$-pin
$29_i$ abutment
30 conduit
32 conduit wall
34 front-end
36 rear-end
37 inner surface of conduit
38 outer surface of conduit
40 front-end cap
42 through hole
50 filter element
52 channel of filter element
60 rear-end cap
64 front-end cap facing surface of the rear-end cap 60
66 rearward facing surface of the rear-end cap 60, wherein the rear facing surface 66 faces in the opposite direction as the front-end cap facing surface 64 of the rear-end cap 60
100 filter housing
102 longitudinal axis
$120_j$ protrusions ($1 \leq j \leq m$)
$124_j$ forward-facing surface of the $j^{th}$-protrusion
$125_j$ radially outwardly facing surface of the $j^{th}$-protrusion
$126_j$ rear-end cap facing surface of the $j^{th}$-protrusion
$129_j$ abutment
130 tube
136 rear-end cap facing side of tube 130/distal end of tube 130/free end of tube 130
138 peripheral surface of tube 130
$d_i$ distance between the $i^{th}$-end cap facing surfaces $22_i$ of the $i^{th}$-pin and reference plane 12
$\Delta d_{i,i'}$ axial distance between the front facing surfaces $24_i$, $24_{i'}$ of the $i^{th}$ and the $i'^{th}$-pin $20_i$, $20_{i'}$
$\varphi_i$ azimuthal position of the $i^{th}$-pin
$\Delta\varphi_i^s$ azimuthal span of the $i^{th}$-pin
$\Delta\varphi_{i,i'}^d$ azimuthal distance between the $i^{th}$-pin $20_i$ and the $i'^{th}$-pin $20_{i'}$
$\Delta\varphi_j^s$ azimuthal span of the $j^{th}$-protrusion $120_j$
$\Delta\varphi_{j,j'}^d$ azimuthal distance between the $j^{th}$-protrusion $120_j$ and the $j'^{th}$-protrusion $120_{j'}$
$r_i$ free radius as defined by the radially inwardly facing surface of the $i^{th}$-pin
$R_j$ max radius as defined by the radially outwardly facing surface of the $j^{th}$-protrusion

The invention claimed is:

1. A conduit configured to be a part of at least one of a fluid filter cartridge and a filter cartridge housing, wherein the conduit has a first cylindrical surface defining a first longitudinal axis,
wherein:
the first cylindrical surface has a front-end and a rear-end,
n pins extend from the first cylindrical surface at azimuthal positions ranging from $\varphi_i$ to $\varphi_i+\Delta\varphi_i^s$, $\forall i \in \{1, 2, \ldots, n\}$, wherein i is a number of a pin of the n pins and $\Delta\varphi_i^s$ is an azimuthal span of an $i^{th}$-pin and wherein n is a natural number,
each pin has a forward-facing surface that faces away from the rear-end,
the $i^{th}$ pin and an $(i+1)^{th}$ pin are spaced from each other azimuthally by an azimuthal distance $\Delta\varphi_{i,i+1}^d$, $\forall i \leq n-1$, wherein the $n^{th}$-pin is azimuthally neighbored to the first pin,
distances $d_i$ between forward-facing surfaces of the n pins and a reference plane increase or decrease with respective azimuthal positions $\varphi_i$ of corresponding pins by a change of distance $\Delta d_{i,i+1}$ from the first pin towards the $n^{th}$-pin and by a value of $-\Delta d_n = (1+\alpha) \Sigma_{1=1}^{n-1} d_i$ from the $n^{th}$-pin to the first pin, wherein the reference plane is perpendicular to the first longitudinal axis and is either at a front side or at a rear side of all n pins, wherein $\alpha \in \{0.25, 0.2, 0.15, 0.1, 0.05, 0.025, 0.01, 0\}$, and
an absolute value of an azimuthal distance $\Delta\varphi_{n,1}^d$ between the $n^{th}$-pin and the first pin is greater or equal than the maximum azimuthal distance $\Delta\varphi_{i,i+1}^s$ of any other pair of neighbored pins such that $\Delta\varphi_{n,1}^d \geq \text{Max}(\{\Delta\varphi_{i,i+1}^d : 1 \leq i < n\})$.

2. A conduit of claim 1, comprising at least a conduit wall with a front-end, a rear-end, an inner surface, and an outer surface, wherein the inner surface or the outer surface is the first cylindrical surface of the conduit.

3. A conduit of claim 1, wherein
at least some of the front-end facing surfaces of the pins are inclined in azimuthal direction.

4. A conduit of claim 1, wherein each of
the first pin and the $n^{th}$-pin has a corresponding azimuthal abutment, and wherein azimuthal abutments of the first pin and the $n^{th}$-pin are mutually opposed.

5. A conduit of claim 1, wherein the change of distance $\Delta d_{i,i+1}$ obeys $\Delta d_{i,i+1} = c_i$, $\forall 1 \leq i < n$ and/or $\Delta d_{i,i+1} = c_i \cdot (\Delta\varphi_i^s + \Delta\varphi_{i,i+1}^d)$, $\forall 1 \leq i < n$, wherein $|c_{i+1}(1-\alpha_c)| \leq |c_i| \leq c_{i+1}(1+\alpha_c)$, and $\alpha_c \in \{0.25, 0.2, 0.15, 0.1, 0.05, 0.025, 0.01, 0\}$.

6. A kit comprising at least:
the conduit of claim 1, and
a tube configured for the filter cartridge housing and/or the fluid filter cartridge with a second cylindrical surface for being received at least partially by a first volume enclosed by the first cylindrical surface or the conduit or for receiving at least partially the first cylindrical surface in a second volume that is enclosed by the second cylindrical surface, wherein:
the second cylindrical surface defines a second longitudinal axis and has a second front-end and a second rear-end, and
at least a first protrusion extends from the second cylindrical surface, and
the at least the first protrusion has an azimuthal span $\Delta\phi_1^s$ and a pin facing surface, and
the azimuthal span $\Delta\phi_1^s$ is greater than the azimuthal distance $\Delta\varphi_{i,i+1}^d$ between the pins for each i such that $i+1 \leq n$ and the azimuthal span $\Delta\phi_1^s$ is smaller than $\Delta\varphi_{n,1}^d$.

7. A kit of claim 6, wherein the at least the first protrusion includes m protrusions that protrude from the second cylindrical surface, wherein each $j^{th}$ of the m protrusions has a set of associated azimuthal angles $\{\beta_j : \phi_j \leq \beta_j \leq \phi_j + \Delta\phi_j^s\}$, wherein m is an integer number, and wherein $\varphi_i + \Delta\varphi_i^s \leq \beta_j \leq \varphi_{i+1}$, $\forall 1 \leq i < n$, $1 \leq j \leq m$ if the second longitudinal axis and the first longitudinal axis are aligned and if the conduit and the tube are oriented to obey the condition $\phi_1 + \Delta\phi_1^s = \varphi_1$.

8. A kit of claim 6, wherein the conduit comprises at least a conduit wall with a front-end, a rear-end, an inner surface, and an outer surface, and wherein the inner surface or the outer surface is the second cylindrical surface of the tube.

9. A fluid filter cartridge comprising at least:
a filter element forming a fluid channel with a longitudinal channel axis and having a front side and a rear side;
a through hole in the front side,
the conduit according to claim 1, wherein the conduit is in fluid communication with the fluid channel via the through hole, and wherein a front end of the conduit faces away from a rear end of the fluid filter cartridge and wherein the longitudinal channel axis is the first longitudinal axis.

10. A filter cartridge according to claim 9, further comprising at least:

a front-end cap sealingly attached to the front side of the filter element, and a rear-end cap sealingly attached to the rear side of the filter element.

11. A filter system comprising:

the filter cartridge according to claim 9; and the filter housing, wherein the filter housing comprises at least:

a housing bottom, a housing cover removably attached to the housing bottom, wherein the housing cover and the housing bottom enclose a space dimensioned to receive the filter cartridge, and a filter socket located inside the filter housing;

wherein:

the filter socket includes a tube, at least one of a front end of the tube or a rear end of the tube is a free end, the tube has a fluid opening configured to received and/or provide a fluid from and/or to the filter cartridge, the tube has a second cylindrical surface configured to be received at least partially by a first volume enclosed by the first cylindrical surface of the conduit or configured to receive at least partially the first cylindrical surface in a second volume that is enclosed by the second cylindrical surface, wherein:

the second cylindrical surface defines a second longitudinal axis and has a second front end and a second rear end, at least a first protrusion extends from the second cylindrical surface, the at least the first protrusion has an azimuthal span Aps and a surface facing a pin of the n pins, and the azimuthal span $\Delta\phi_1^s$ is greater than the azimuthal distance $\Delta\varphi_{i,i+1}^d$ between the pins for each i such that i+1≤n and the azimuthal span $\Delta\phi_1^s$ is smaller than $\Delta\varphi_{n,1}^d$.

12. A method comprising:

using the filter system according to claim 11:

24.1 inserting the free end of the conduit via the through hole of the filter element into the fluid channel of the filter element;

24.2 pushing the front end of the conduit towards the socket until at least one of the n pins abuts with a forward facing surface of said at least one of the n pins against a surface of a protrusion; and 24.3 while pushing the front end of the conduit towards the filter socket, rotating the filter cartridge until further rotation is blocked.

13. A method according to claim 12, further comprising closing the housing cover.

14. A method according to claim 13, wherein, when the filter cartridge includes a front-end cap sealingly attached to the front side of the filter element and a rear-end cap sealingly attached to the rear side of the filter element, the method further comprises, between the steps and said closing the housing cover, pushing the front-end cap towards the socket until the filter cartridge abuts an axial block.

* * * * *